United States Patent
Kim et al.

(10) Patent No.: US 7,283,184 B2
(45) Date of Patent: Oct. 16, 2007

(54) STRUCTURE FOR ASSEMBLING LAMP WIRE FOR BACKLIGHT ASSEMBLY INTO LIQUID CRYSTAL DISPLAY MODULE

(75) Inventors: Hyo Jin Kim, Chinju-shi (KR); Sang Hyun Park, Ulsan-Kwangyokshi (KR)

(73) Assignee: LG.Philips Co., Ltd., Seoul (KR)

( * ) Notice: Subject to any disclaimer, the term of this patent is extended or adjusted under 35 U.S.C. 154(b) by 540 days.

(21) Appl. No.: 10/326,402

(22) Filed: Dec. 23, 2002

(65) Prior Publication Data

US 2003/0117544 A1    Jun. 26, 2003

(30) Foreign Application Priority Data

Dec. 26, 2001   (KR) ............................... 2001-85172

(51) Int. Cl.
  *G02F 1/1333*   (2006.01)
  *H02B 1/20*     (2006.01)
  *H05K 5/00*     (2006.01)
(52) U.S. Cl. ...................... 349/58; 361/681; 361/826
(58) Field of Classification Search ............ 349/56, 349/58–64; 361/681–682, 826–827; 362/31, 362/58, 65
See application file for complete search history.

(56) References Cited

U.S. PATENT DOCUMENTS 5,815,224 A  *  9/1998  Hasegawa et al. ............ 349/58
6,386,722 B2 *  5/2002  Okumura ..................... 362/31

FOREIGN PATENT DOCUMENTS

EP          429256 A2 *   5/1991
KR   10-2001-0094914      11/2001

* cited by examiner

*Primary Examiner*—Dung T. Nguyen
(74) *Attorney, Agent, or Firm*—McKenna, Long & Aldridge LLP

(57) ABSTRACT

A structure for securing lamp wires of a backlight assembly within an LCD module includes a liquid crystal panel, a mold frame, a lamp, and a structure for securing lamp wires within a backlight assembly within the LCD module. The structure includes an through which the lamp wires extend, lower and upper inserting grooves in lower and upper portions of the opening for receiving the lamp wires, and a tube for covering portions of a lamp wire to which a high voltage is applied. The tube covers portions of the lamp wire between a location at a junction wherein the lamp wire and the lamp are connected and a portion where the lamp wire extends through the opening.

17 Claims, 5 Drawing Sheets

STRUCTURE FOR ASSEMBLING LAMP WIRE FOR BACKLIGHT ASSEMBLY INTO LIQUID CRYSTAL DISPLAY MODULE

This application claims the benefit of the Korean Application No. P2001-85172 filed on Dec. 26, 2001, which is hereby incorporated by reference for all purposes as if fully set forth herein.

BACKGROUND OF THE INVENTION

1. Field of the Invention

The present invention relates to backlight assemblies within liquid crystal display (LCD) modules, and more particularly to a structure for securing lamp wires of the backlights within LCD modules.

2. Discussion of the Related Art

Compared to cathode-ray tubes (CRTs), flat panel displays (e.g., liquid crystal displays (LCDs), plasma display panels (PDPs), field emission displays (FEDs), etc.) display high quality images, consume a relatively low amount of power, produce a low amount of heat, and may be fabricated in small sizes. Due to these characteristics, LCDs in particular are extensively used in devices such as watches, calculators, personal digital assistants (PDAs), cellular phones, notebook computers, monitors for personal computers (PCs), televisions, TV receivers, monitors in airplanes, etc.

LCDs typically include an LCD panel formed with two thin glass substrates having specially treated surfaces being connected to, and separated from each other via a layer of injected liquid crystal material. The phase of the injected liquid crystal material is between a solid phase and a liquid phase. An orientation of molecules within the injected layer of liquid crystal material may be selectively manipulated by applying a voltage to electrodes formed on the two thin glass substrates. By manipulating the orientation of the liquid crystal molecules, light transmittance characteristics of the LCD panel may be selectively controlled. Accordingly, images may be expressed to varying degrees of brightness by the LCD panel. It should be noted, however, that LCD panels are not, by themselves, capable of emitting light. Accordingly, a light source (e.g., a lamp) is required to display images on the LCD panel.

Generally, light sources included within LCD modules are provided as backlight assemblies arranged behind or along the LCD panel. Referring to FIG. 1, a backlight assembly of an LCD module includes a rectangular mold frame 26, a lamp 27, a metal reflecting plate 29, a light guide 24, a reflecting sheet 25, and a plurality of diffusion and prism sheets 21, 22, and 23.

The mold frame 26 is formed of plastic while the lamp 27 emits light and is mounted within an inner portion of the mold frame 26. The metal reflecting plate 29 is arranged within an inner portion of the mold frame 26 to surround one portion of the lamp 27 and reflect light emitted from the lamp 27. The light guide 24 is mounted within the mold frame 26 and adjacent the lamp 27 to guide light emitted from the lamp 27 uniformly toward the surface of the substrate 10. The -reflecting sheet 25 is arranged under the light guide 24 while the diffusion and prism sheets 21, 22, and 23 are arranged on the light guide 24.

Referring to FIG. 2, each of the first and second lamp wires 28a and 28b, respectively, are connected to respective first and second ends of the lamp 27. Connected to the first and second lamp wires 28a and 28b, the lamp 27 is electrically connected to an external power source. A low voltage is applied to the first end of the lamp 27 via the first lamp wire 28a and a high voltage is applied to the second end of the lamp 27 via the second lamp wire 28b. The first and second lamp wires 28a and 28b extend outside the LCD module via an opening 26b formed at a corner of the mold frame 26.

The first lamp wire 28a is connected to a junction at the first end of the lamp 27 arranged away from the opening 26b. Accordingly, in order for the first lamp wire 28a to be connected to the external source, the first lamp wire 28a must be guided along a receiving groove 26a formed at an edge of the mold frame 26 through the opening 26b and outside the LCD module. The second lamp wire 28b is connected to a junction at the second end of the lamp 27 arranged near the opening 26b. Accordingly, the second lamp wire 28b may be guided directly through the opening 26b without the use of a structure such as the receiving groove 26a.

As tension is applied to the first and second lamp wires 28a and 28b, tensile forces are directly transmitted through the second lamp wire 28b to second end of the lamp 27 thereby bending the second lamp wire 28b and/or disconnecting the second lamp wire 28b from the second end of the lamp 27. Accordingly, as tension is applied to the first and second lamp wires 28a and 28b, the lamp 27 may become disconnected from the external power supply and the second end of the lamp 27 may further become damaged.

Referring to FIG. 3, the inventors of the present invention have disclosed a structure for securing lamp wires of backlight assemblies within LCD modules. The lamp wires 28 are arranged within the mold frame 126, and a metal chassis 30, similar to the metal chassis shown 30 in FIG. 1, contacts the edge of the liquid crystal display panel 10 and the mold frame 126 to connect the liquid crystal panel 10 to the backlight assembly. Accordingly, first and second lamp wires 28a and 28b may extend through an opening 126b formed within a portion of the mold frame 126 and spaced a predetermined distance from a corner of the mold frame 12 such that the second lamp wire 28b is bent at two locations when a portion of it extends outside the LCD module. Based on the structure shown in FIG. 3, tension applied to the second lamp wire 28b does not result in disconnection of the lamp 27. However, portions of the lamp wires 28 extending out from the opening 126b may become damaged due to sharp edges on the metal chassis 30 when the metal chassis 30 is connected to the mold frame 126.

SUMMARY OF THE INVENTION

Accordingly, the present invention is directed to structure for securing lamp wires of backlight assemblies within liquid crystal display modules that substantially obviates one or more of the problems due to limitations and disadvantages of the related art.

An advantage of the present invention provides a backlight assembly of an LCD device wherein a first end of a lamp wire connected to a low voltage source may be securely connected to a lamp, wherein lamp wires may be prevented from being removed from a mold frame through an opening, and wherein lamp wires may be prevented from being disconnected from a lamp.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD module may, for example, include a liquid crystal panel, a rectangular mold frame, for supporting the liquid crystal panel, arranged behind the liquid crystal panel, a lamp for emitting light arranged within an inner portion of the mold frame, and lamp wires, for electrically connecting the lamp to an external power source, connected to respective ends of the lamp.

In one aspect of the present invention, a structure for securing lamp wires of a backlight assembly within an LCD module may, for example, include an opening arranged proximate a corner of a mold frame, a first lamp wire connected to the first end of the lamp for transmitting a low voltage to the lamp, a second lamp wire connected to a second end of the lamp for transmitting a high voltage to the lamp, wherein the first and second lamp wires extend through the opening, an upper inserting groove formed in an upper portion of the opening, wherein the first lamp wire may be inserted from an upper portion of the mold frame, a lower inserting groove formed in a lower portion of the opening, wherein the second lamp wire may be inserted from a lower portion of the mold frame, and a tube for covering a portion of the second lamp wire between a junction location at the second end of the lamp and a location where the second lamp wire extends through the opening.

In one aspect of the present invention, the first and second lamp wires may be prevented from being pulled out of the opening.

In another aspect of the present invention, a protecting plate may be integrally formed with the mold frame for protecting the second lamp wire, wherein the protecting plate may be formed between the upper inserting groove and the junction location at the second end of the lamp.

In yet another aspect of the present invention, the first and second lamp wires may be prevented from being damaged during a connection of a metal chassis to the mold frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
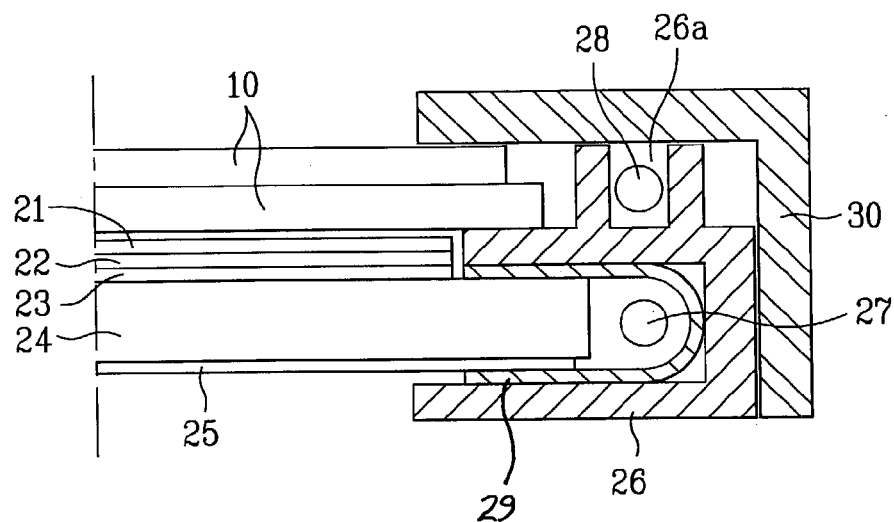
FIG. 1 illustrates a sectional view of an LCD module in a related art LCD device.
Figure 2:
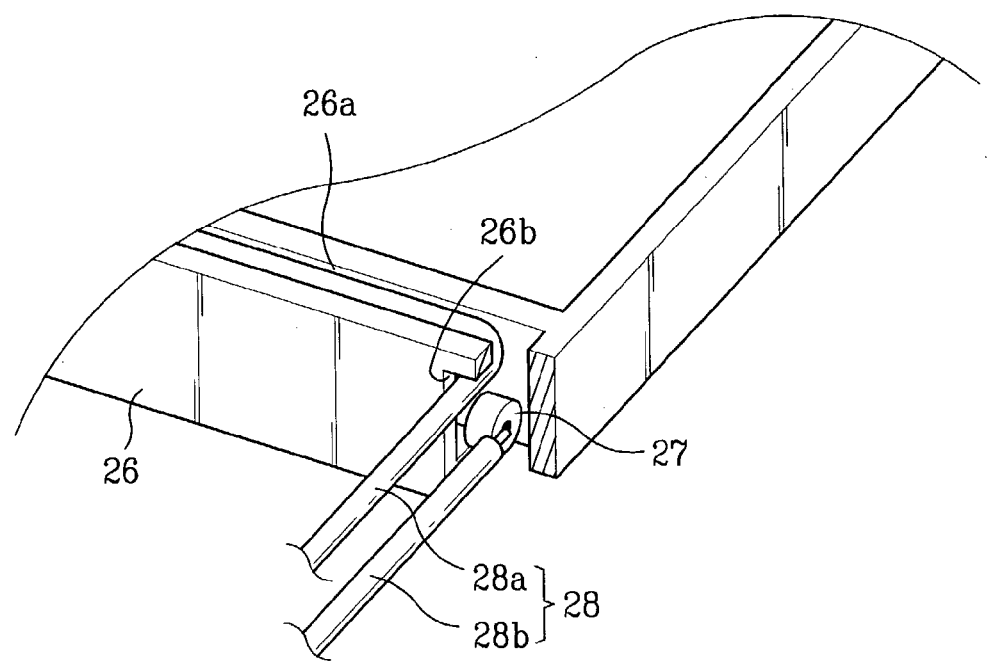
FIG. 2 illustrates a perspective view of a first structure for securing lamp wires of a backlight assembly within the LCD module shown in FIG. 1.
Figure 3:
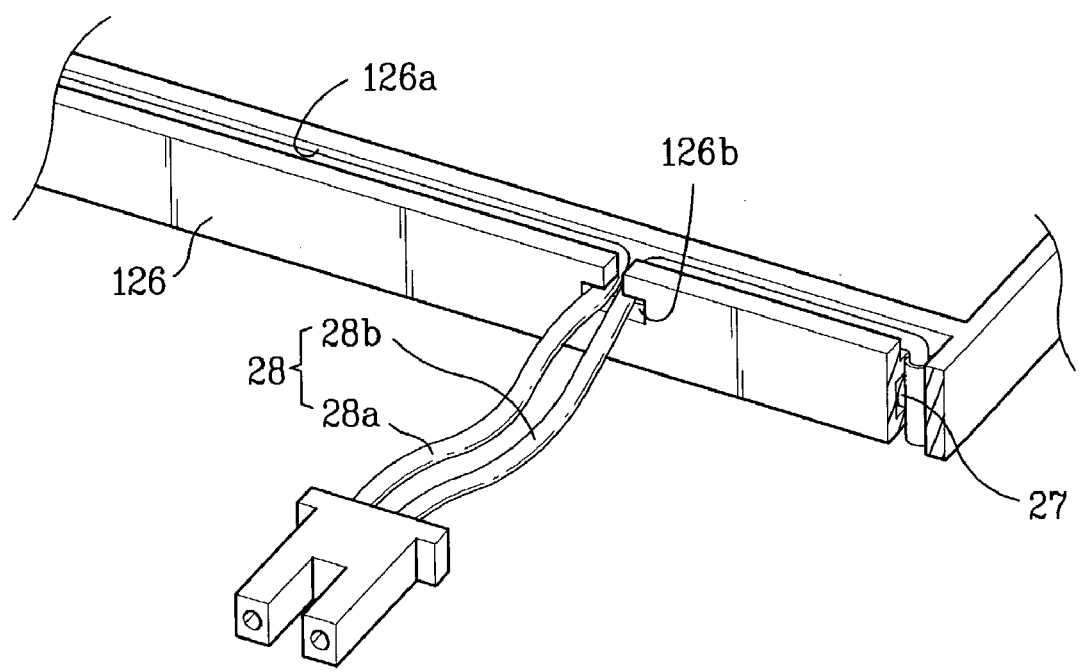
FIG. 3 illustrates a perspective view of a second structure for securing lamp wires of a backlight assembly within a related art LCD module.
Figure 4:
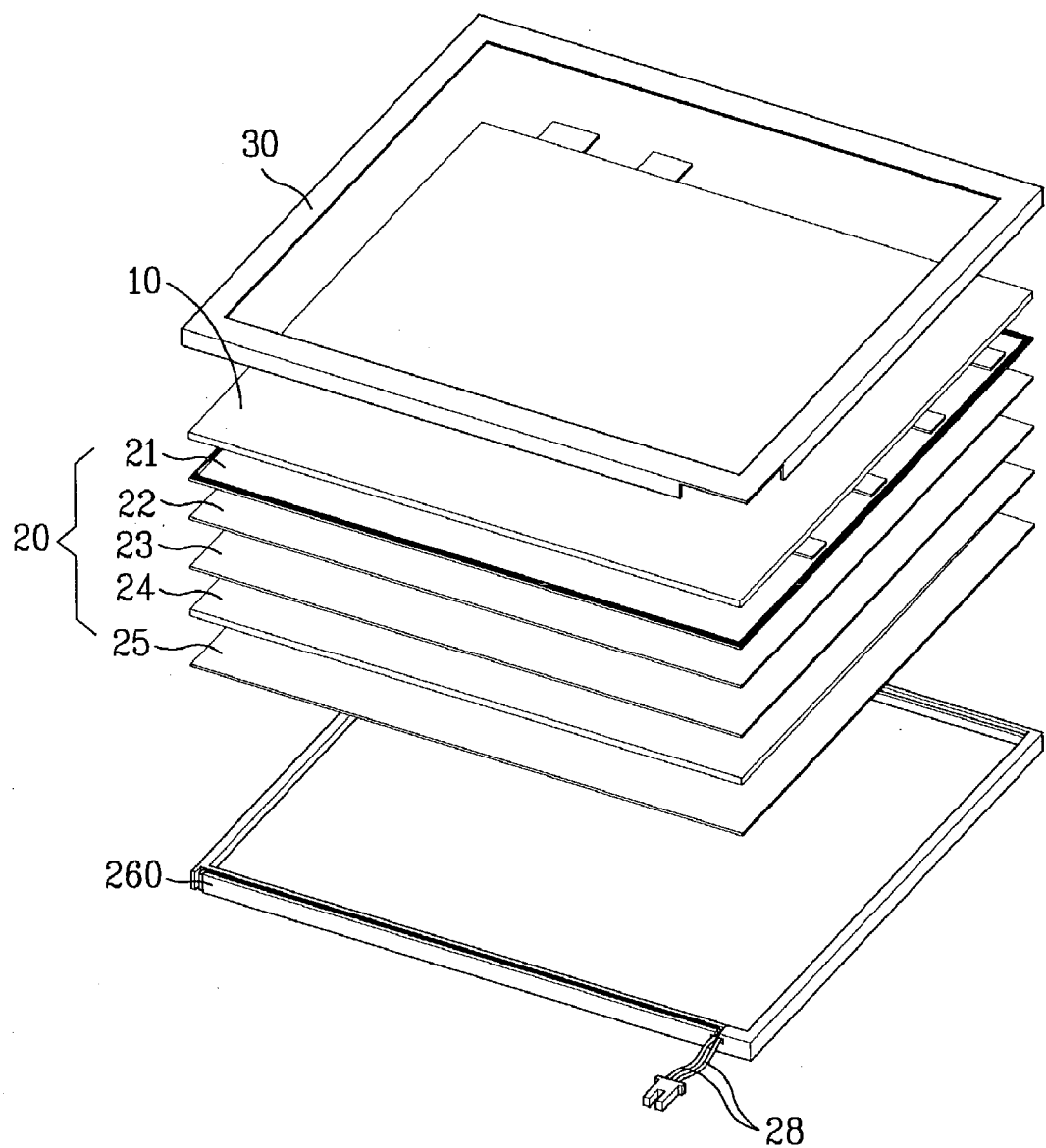
FIG. 4 illustrates a perspective view of a structure for securing lamp wires of a backlight assembly within an LCD module according to one aspect of the present invention.

Reference will now be made in detail to embodiments of the present invention, examples of which are illustrated in the accompanying drawings.

FIGS. 4 to 8 illustrate views of a structure for securing lamp wires of a backlight assembly within an LCD module according to one aspect of the present invention.

Referring to FIGS. 4 to 8, an LCD module may, for example, include a liquid crystal panel 10, a backlight assembly 20, a mold frame 260, and a chassis 30 made out of material such as metal. The liquid crystal panel 10 may be arranged at a front portion of the LCD module and may be used to display images. The backlight assembly 20 may be arranged behind the liquid crystal panel 10 and provide light to the liquid crystal panel 10. The rectangular mold frame 260 may be made of a material such as plastic and may support the liquid crystal panel 10 and the backlight assembly 260. The chassis 30 may surround corners of the liquid crystal panel 10 and the mold frame 260.

The backlight assembly 20 may further include a plurality of diffusion sheet 21 and prism sheets 22 and 23, a light guide 24, and a lamp 27 arranged within an inner portion of the mold frame 260. A lower support 290 may be arranged under the mold frame 260 to prevent the lamp 27 from detaching from the mold frame 260.

In accordance with the principles of the present invention, first and second ends of the lamp 27 may be respectively connected to first and second lamp wires 28a and 28b. Connected to the first and second lamp wires 28a and 28b, the lamp 27 may be electrically connected to an external power source. In one aspect of the present invention, a low voltage may be transmitted through the first lamp wire 28a and applied to the first end of the lamp 27. In another aspect of the present invention, a high voltage may be transmitted through the second lamp wire 28b and applied to the second end of the lamp 27. The first and second lamp wires 28a and 28b may extend through an opening 262 formed within, and proximate a corner of, the mold frame 260 outside the LCD module. The first and second lamp wires 28a and 28b may be guided toward the opening 262 via a first receiving groove 261 formed at an edge of the mold frame 260.

In one aspect of the present invention, the opening 262 may be spaced a predetermined distance from a corner of the mold frame 260 such that the first lamp wire 28a may be bent at two different portions within the mold frame 260. In another aspect of the present invention, the opening 262 may be arranged within the mold frame 260 such that the second end of the lamp 27 is closer to the opening 262 than the first end of the lamp 27.

According to the principles of the present invention, an upper inserting groove 263 may be formed at an upper portion of the opening 262 such that the first lamp wire 28a may be inserted through the upper inserting groove 263 to be secured within the opening 262. A lower inserting groove 264 may, for example, be formed at a lower portion of the opening 262, such that the second lamp wire 28b may be inserted through the lower inserting groove 264 to be secured within the opening 262. In one aspect of the present invention, the upper and lower inserting grooves 263 and 264, respectively, may be formed in upper and lower portions of the mold frame 260, respectively. A width of the upper inserting groove 263 may be slightly greater than the first diameter of the first lamp wire 28a. In one aspect of the present invention, a tube 28c, made of a material that shrinks upon being heated, may be provided to cover portions of the second lamp wire 28b arranged between a junction location at the second end of the lamp 27 and a location where the second lamp wire 28b extends through the opening 262. A width of the lower inserting groove 264 may be slightly greater than the second diameter of the second lamp wire 28b, covered by the tube 28c.

Figure 5:
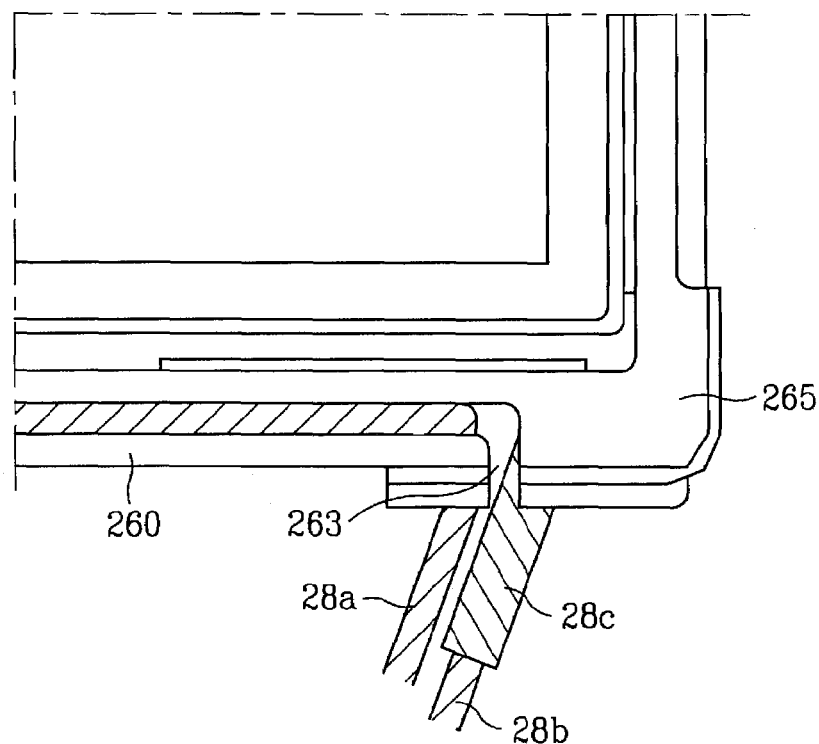
FIG. 5 illustrates a schematic view of a structure for securing lamp wires of a backlight assembly within the LCD module shown in FIG. 4.
Figure 6:
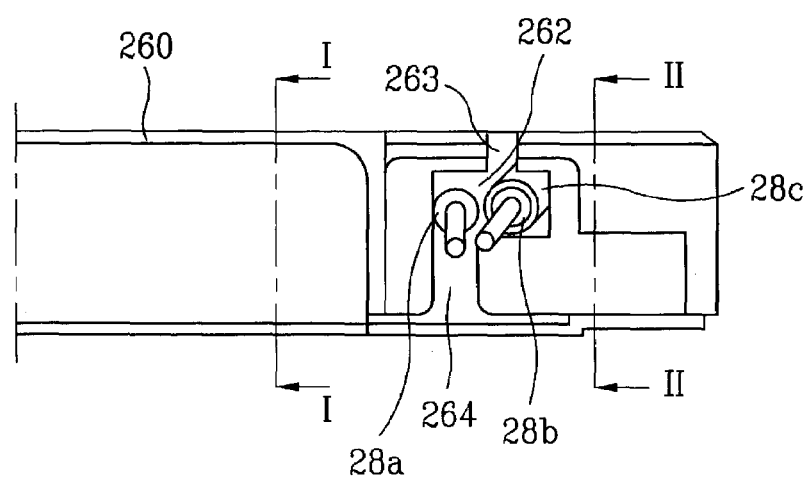
FIG. 6 illustrates a front view of a structure for securing lamp wires within the LCD module shown in FIG. 5.

Referring to FIGS. 5 and 6, due to the presence of the tube 28c, the second diameter of the second lamp wire 28b may be greater than the first diameter of the first lamp wire 28a. Accordingly, the second lamp wire 28b experiences greater tensile forces than the first lamp wire 28a. Since the first and second lamp wires 28a and 28b are both arranged within the opening simultaneously, the second lamp wire 28b, covered by the tube 28c, may at least partially block the upper inserting groove 263. Accordingly, the second lamp wire 28b may press on the first lamp wire 28a in a direction away from the corner of the mold frame 260 proximate the opening 262, due to the tensile force induced by the tube 28c. Since the second lamp wire 28b presses on the first lamp wire 28a, the first lamp wire 28a is not capable of entering the upper inserting groove 263 nor is the first lamp wire 28a capable of being removed from the opening 262. In one aspect of the present invention, the first lamp wire 28a may at least partially block the lower inserting groove 264. In another aspect of the present invention, the lower support 290 may be arranged at a bottom surface of the mold frame 260 to secure the lamp 27 and the first and second lamp wires 28a and 28b within the mold frame 260.

According to the principles of the present invention, an upper inserting groove 263 maybe formed at an upper portion of the opening 262 such that the, first lamp wire 28a may be inserted through the upper inserting groove 263 to be secured within the opening 262. A lower inserting groove 264 may, for example, be formed at a lower portion of the opening 262, such that the second lamp wire 28b may be inserted through the lower inserting groove 264 to be secured within the opening 262. In one aspect of the present invention, the upper and lower inserting grooves 263 and 264, respectively, may be formed in upper and lower portions of the mold frame 260, respectively. A width of the upper inserting groove 263 may be slightly greater than the first diameter of the first lamp wire 28a. In one aspect of the present invention, a tube 28c, made of a material that shrinks upon being heated, may be provided to cover portions of the second lamp wire 28b arranged between a junction location at the second end of the lamp 27 and a location where the second lamp wire 28b extends through the opening 262. A width of the lower inserting groove 264 may be slightly greater than a second diameter of the second lamp wire 28b covered by the tube 28c.

Referring to FIGS. 5 and 6, the diameter of the tube 28c, covering portions of, the second lamp wire 28b, may be greater than the first diameter of the first lamp wire 28a. Also, the second lamp wire 28b experiences greater tensile forces than the first lamp wire 28a. Since the first and second lamp wires 28a and 28b are both arranged within the opening simultaneously, the second lamp wire 28b, covered by the tube 28c, may at least partially block the upper inserting groove 263. Accordingly, the second lamp wire 28b may press on the first lamp wire 28a in a direction away from the corner of the mold frame 260 proximate the opening 262, due to the tensile force induced by the tube 28c. Since the second lamp wire 28b presses on the first lamp wire 28a, the first lamp wire 28a is not capable of entering the upper inserting groove 263 nor is the first lamp wire 28a capable of being removed from the opening 262. In one aspect of the present invention, the first lamp wire 28a may at least partially block the lower inserting groove 264. In another aspect of the present invention, the lower support 290 may be arranged at a bottom surface of the mold frame 260 to secure the lamp 27 and the first and second lamp wires 28a and 28b within the mold frame 260.

A method for securing the lamp wires of the backlight within the LCD module will now be explained in greater detail.

According to the principles of the present invention, lamp connection ends of the first and second lamp wires 28a and 28b may be connected (e.g., welded) to first and second ends of the lamp 27, respectively. Subsequently, the tube 28c may be formed over the second lamp wire 28b, subjected to heat, and shrunken conformably around the second lamp wire 28b such that the tube 28c may cover portions of the second lamp wire 28b from at least between the second end of the lamp 27 to within the opening 262.

Figure 7:
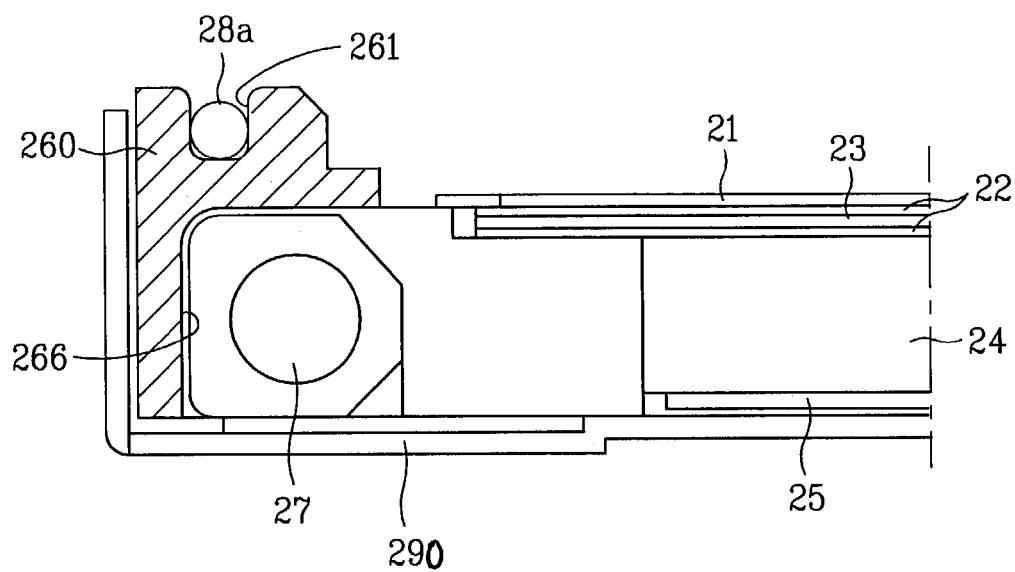
FIG. 7 illustrates a sectional view of the LCD module shown in FIG. 6, along line I-I.
Figure 8:
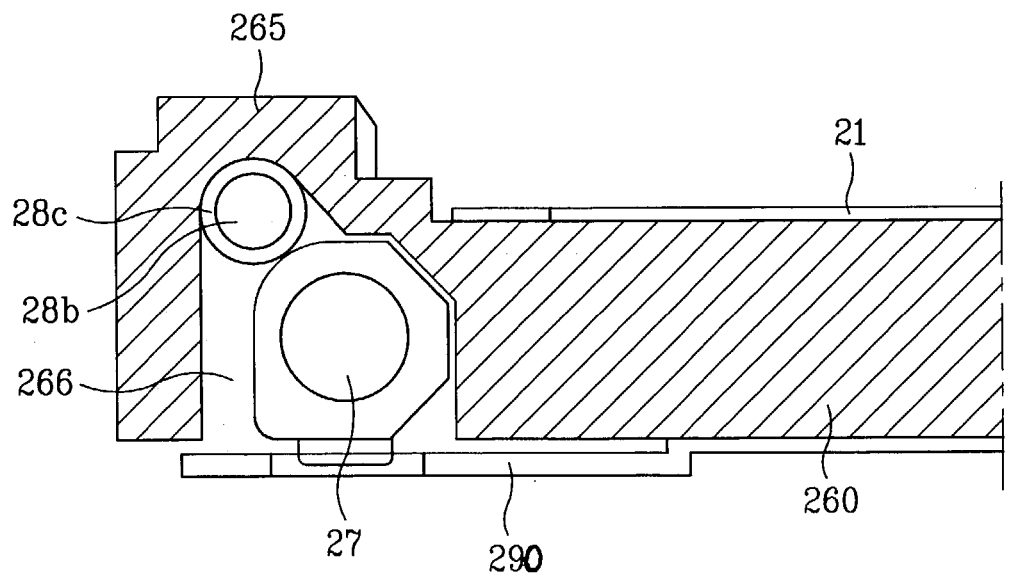
FIG. 8 illustrates a sectional view of the LCD module shown in FIG. 6, along line II-II.

Referring to FIGS. 6, 7, and 8, the lamp 27 may be mounted along a second receiving groove 266 formed within the mold frame 260. Accordingly, the second lamp wire 28b may be inserted from a lower portion of the lower inserting groove 264 in the mold frame 260 into the opening 262 and the first lamp wire 28a may be inserted from an upper portion of the upper inserting groove 263 into the opening 262 and guided along the first receiving groove 261 to the first end of the lamp 27.

According to the principles of the present invention, the first and second lamp wires may be bent at several locations, may be inserted from upper and lower portions of an opening formed in a mold frame, and may respectively extend through upper and lower portions of the opening. Additionally, the lamp wire transmitting high voltage may be in a state of higher tension force and, when combined with a tube, may have a greater diameter compared to the lamp wire transmitting low voltage. Accordingly, the lamp wire transmitting the high voltage may be prevented from being removed from the opening and the lamp wires may be prevented from being damaged when a chassis is coupled to the mold frame. Additionally, a protecting plate provided at an upper portion of the mold frame, may prevent the lamp wire transmitting the high voltage from being damaged from sharp edges of the chassis.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An LCD module, comprising:
   a liquid crystal panel;
   a mold frame for supporting the liquid crystal panel, the mold frame arranged behind the liquid crystal panel, the mold frame containing an opening arranged proximate a corner of the mold frame;
   a lamp for emitting light, the lamp arranged within an inner portion of the mold frame;
   first and second lamp wires electrically connecting the lamp to an external power source through the opening, the first and second lamp wires connected first and second ends of the lamp, respectively, wherein the first end of the lamp is further away from the opening than the second end of the lamp;

an upper inserting groove through which the first lamp wire is insertable, the upper inserting groove being formed in an upper portion of the opening;

a lower inserting groove through which the second lamp wire is insertable being formed in a lower portion of the opening; and a tube for covering portions of the second lamp wire between a junction location at the second end of the lamp and a location where the second lamp wire extends through the opening.

2. The LCD module as claimed in claim 1, wherein the tube is formed of a material that shrinks upon being exposed to heat.

3. The LCD module as claimed in claim 1, wherein the first lamp wire transmits a low voltage.

4. The LCD module as claimed in claim 1, wherein the second lamp wire transmits a high voltage.

5. The LCD module as claimed in claim 1, wherein the upper inserting groove is arranged in an upper portion of the mold frame.

6. The LCD module as claimed in claim 1, wherein the lower inserting groove is arranged in a lower portion of the mold frame.

7. A structure for securing wires within an LCD module a lamp having first and second ends, a first lamp wire having a first diameter connected to the first end of the lamp, a second lamp wire, and a tube having a second diameter and covering portions of the second lamp wire, wherein the second diameter is greater than the first diameter, the structure comprising:

a frame for supporting the lamp, the frame including a opening through which the first and second lamp wires extend, an upper inserting groove arranged at an upper portion of the opening, and a lower inserting groove arranged at a lower portion of the opening.

8. The structure for securing wires within an LCD module according to claim 7, further comprising a lower support for preventing the lamp from detaching from the frame, the lower support being arranged under the frame.

9. The structure for securing wires within an LCD module according to claim 7, wherein the tube covers portions of the second lamp wire between a junction location at the second end of the lamp wherein and a location where the second lamp wire extends through the opening.

10. The structure for securing wires within an LCD module according to claim 7, wherein the first lamp wire is insertable into the opening through the upper inserting groove.

11. The structure for securing wires within an LCD module according to claim 7, wherein the second lamp wire is insertable into the opening through the lower inserting groove.

12. A LCD module, comprising:

a frame including an opening, a first receiving groove, and a second receiving groove;

a lamp arranged within the second receiving groove, the lamp having first and second ends, wherein the second end of the lamp is closer to the opening than the first end of the lamp;

a first lamp wire arranged within the first receiving groove, the first lamp wire connected to the first end of the lamp;

a second lamp wire connected to the second end of the lamp, wherein the first and second lamp wires extend through the opening; and a lower inserting groove formed in an lower portion of the frame in communication with the opening, wherein the second lamp wire is insertable into the lower inserting groove.

13. The LCD module according to claim 12, wherein a low voltage is transmitted through the first lamp wire and a high voltage is transmitted through the second lamp wire.

14. The LCD module according to claim 12, further comprising an upper inserting groove formed in an upper portion of the frame in communication with the opening, wherein the first lamp wire is insertable into the upper inserting groove.

15. The LCD module according to claim 12, further comprising a tube covering portions of the second lamp wire.

16. The LCD module according to claim 15, wherein a portion of the first lamp wire has a first diameter and a portion of the tube has a second diameter different from the first diameter.

17. The LCD module according to claim 15, wherein at least a portion of the tube has a greater diameter than at least a portion of the first lamp wire.

* * * * *